Figure 1:
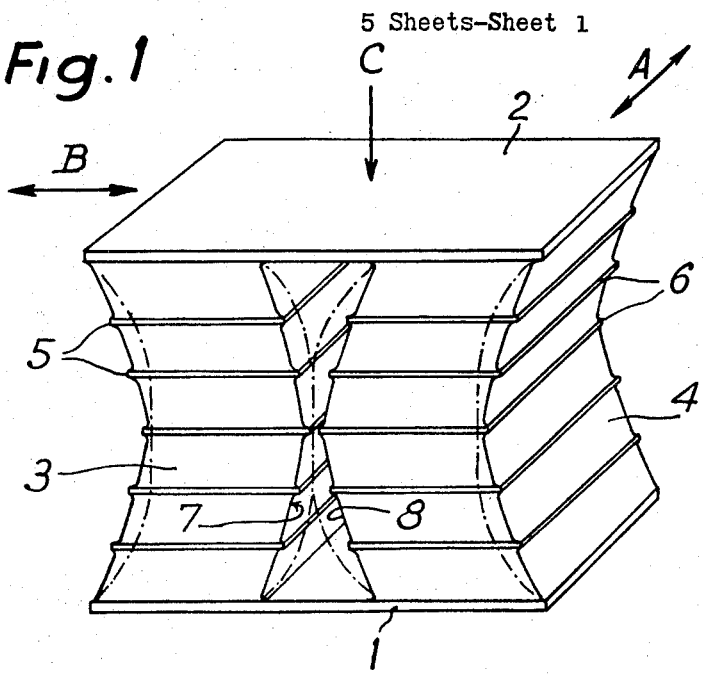

United States Patent

[11] 3,575,403

| [72] | Inventors | Denis M. Hamel<br>St. Mande;<br>Joachim Tank, Paris, France |
|---|---|---|
| [21] | Appl. No. | 788,739 |
| [22] | Filed | Jan. 3, 1969 |
| [45] | Patented | Apr. 20, 1971 |
| [73] | Assignee | Pneumatiques, Caoutchouc Manufacture Et Plastiques Kleber-Colombes<br>Place de Valmy, Colombes, France |
| [32] | Priority | Mar. 21, 1968, Mar. 28, 1968 |
| [33] | | France |
| [31] | | 144,874 and 146,051 |

[54] RUBBER-CONTAINING SPRING MEANS
15 Claims, 15 Drawing Figs.

[52] U.S. Cl. .................................................. 267/63, 267/152
[51] Int. Cl. ................................................... F16f 1/40
[50] Field of Search .......................................... 267/63, 35, 152, 153

[56] References Cited
UNITED STATES PATENTS

| 3,134,585 | 5/1964 | Trask | 267/1(53) |
| 3,424,448 | 1/1969 | Chak Ma | 267/35 |

*Primary Examiner*—James B. Marbert
*Attorney*—Holcombe, Wetherill and Brisebois ABSTRACT: This invention relates to compression springs of the type comprising layers of rubber adhered to metal end and intermediate plates, and according to the invention, at least two spring block elements are spaced horizontally and positioned so that said elements tend to approach each other and to lean on one another when the spring flexes under a compression load, this arrangement progressively increasing the horizontal rigidity in shear as a function of the flexibility in compression.

Patented April 20, 1971 3,575,403

5 Sheets-Sheet 1

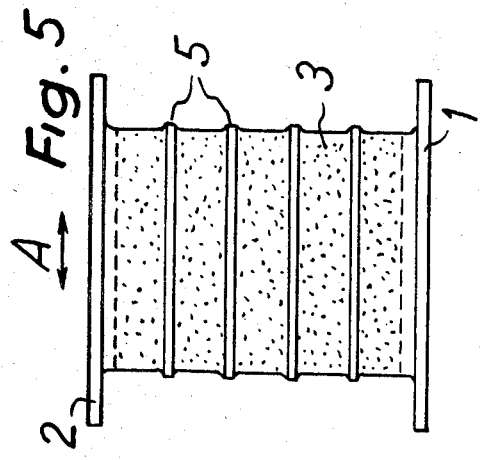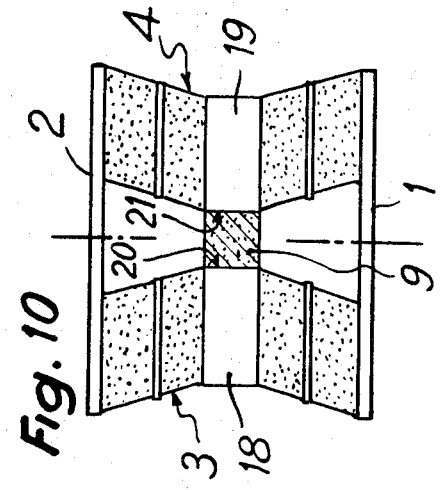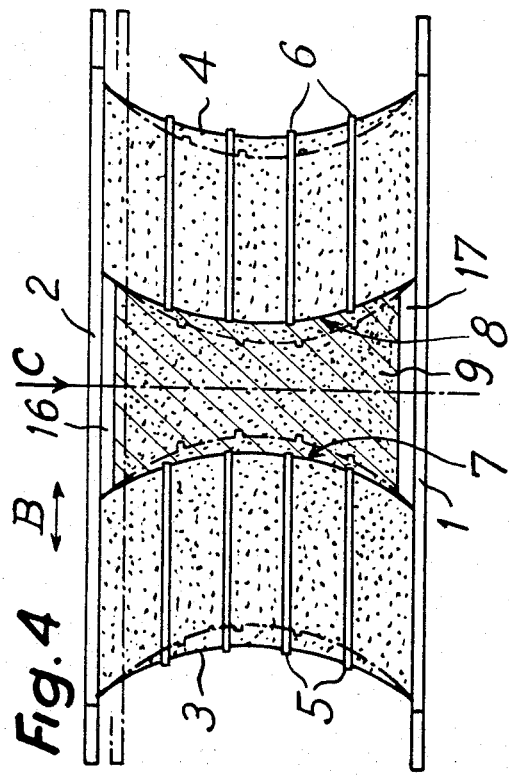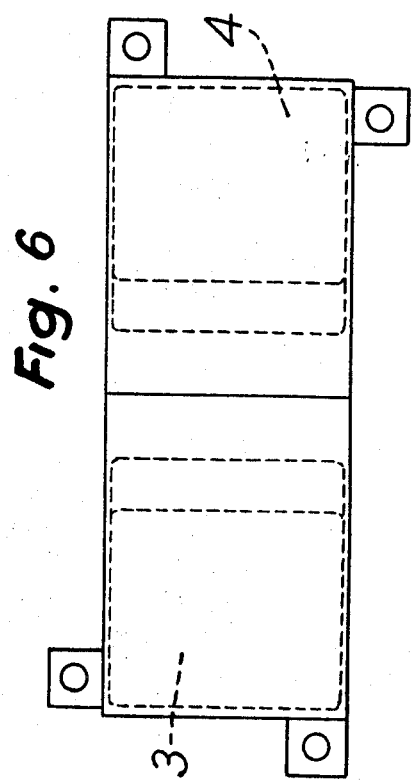

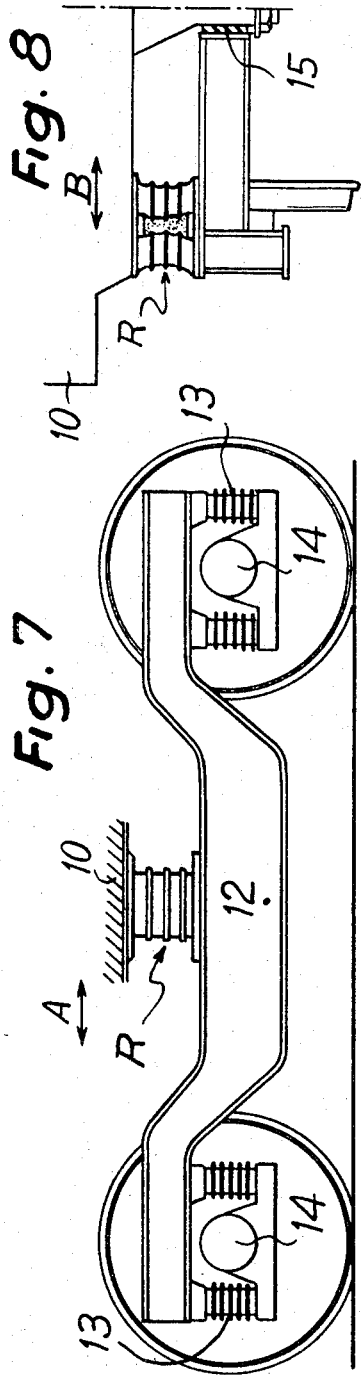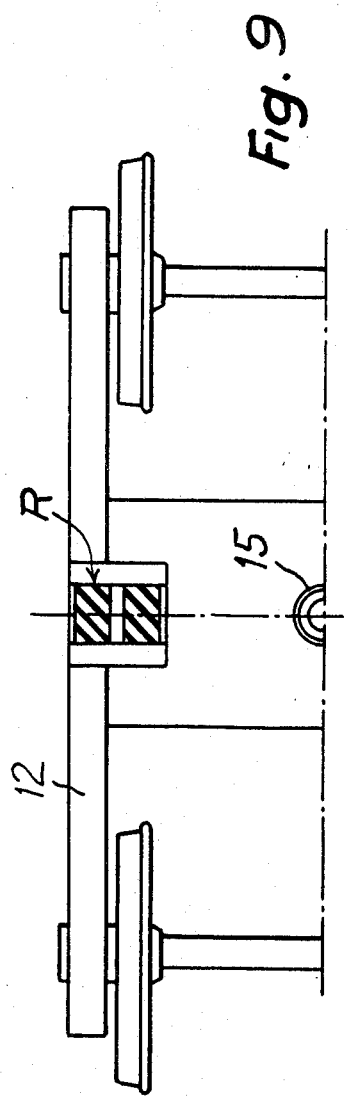

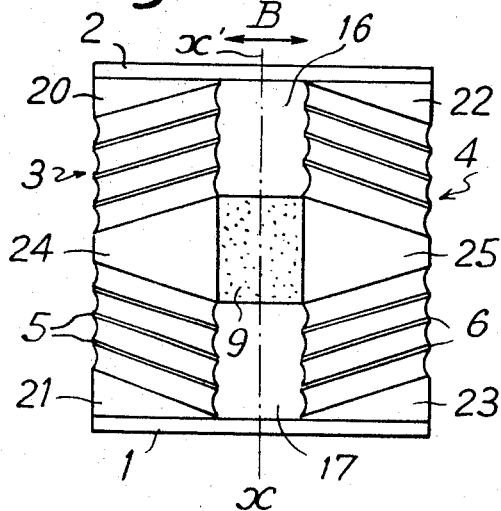
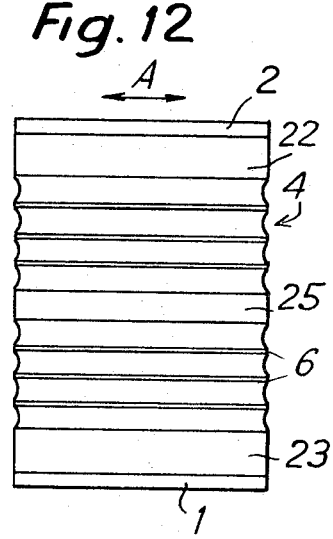
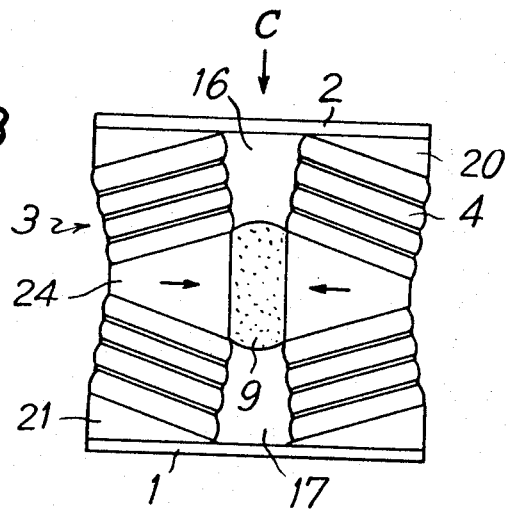

RUBBER-CONTAINING SPRING MEANS

The present invention relates to improvements in rubber compression spring units including spring elements of the sandwich type comprising layers of rubber bonded to metal end plates and intermediate metal plates, the element forming a resilient block with a laminated structure. The invention relates more particularly to rubber spring units of this type, intended for operation chiefly in compression to support a load or a pressure exerted vertically and to work occasionally in shear when, to the main effect of compression, there is added a component directed horizontally and resulting, for example, in a horizontal displacement of the supported load.

Spring units of this kind are used, for example, in the suspensions of railway carriages to support the carriage body either directly on the bogie chassis (secondary suspension) or on floating bolsters (tertiary suspension). These spring units are placed on each side of the body chassis or each edge of the bolster and form the side bearers for the body on the bogie. In these applications, these rubber spring units have in particular the advantage of preventing the transmission of mechanical and sound vibrations between the bogie and the body of the carriage and of reducing, in consequence, the running noises.

When the vertical deflection of the carriage suspension is effected at another part of the suspension, the side bearers are not required to have a large vertical deflection under load but they are required on the other hand to have a slight stiffness in horizontal shear in the longitudinal direction of the carriage, to allow particularly the rotation of the bogie or the floating bolsters with respect to the body when the carriage is moving in a curve. The spring units must also offer a definite resilience in horizontal shear in the transverse direction to allow the displacement and the transverse return of the body with respect to the chassis of the bogie. This transverse return, in the case of railway carriages, should have a value that is almost constant whatever the load transported by the carriage and it is estimated that it ought to be equal to that which would be assured by a pendular suspension system of the body by means of links of 500 millimeters in length.

However, certain of these requirements are mutually contradictory. It is of course known that the stiffness in shear of a rubber spring diminishes rather more as the spring is compressed, and that it can even become negative, the spring being therefore instable. This is a serious drawback to the use of such rubber springs as side bearers of the body when the loading of the body can vary to a high degree between the unladen weight and the full load as is the case for goods wagons and for passenger carriages. In these cases, in fact, it is difficult to produce rubber spring units offering the desired rigidity in shear, not only when the carriage is unladen but also when it is fully loaded or overloaded. In fact, contrary to what happens in reality with rubber spring units of the known type, the rigidity of horizontal shear ought to increase at the same time as the load in compression so that the proper transverse frequency remains almost constant.

The invention thus has for a particular object new types of rubber spring units offering this property of having a stiffness in horizontal shear which increases as the load in compression increases, so that (in the case where these spring units are used to support the body of a carriage) the proper transverse frequency of these spring units retains an almost constant value or one which varies within well enough defined limits in spite of the variation of the load in compression.

According to the invention this result is obtained with a rubber compression spring unit including spring elements with intermediate metal plates characterized in that it comprises at least two spaced spring block elements and arranged so that, when the spring flexes in compression, the blocks tend to approach and rest on each other, which increases in this position the total resistance of the spring to horizontal shear stresses. Preferably, the spring block elements are inclined one towards the other and can be arranged in particular so that the support surface of the two blocks increases in dependence on the load end of the flexibility in compression corresponding to the spring so that the rigidity in horizontal shear correspondingly increases.

Preferably the space between the two spring block elements is filled with an elastic material such as cellular rubber. When the spring unit bends in compression and when the block elements draw near each other, this elastic material is compressed by the blocks and the resistance which it offers, to the approach of the blocks, effects a more progressive increase in the horizontal rigidity in shear of the spring unit.

According to another feature of the invention, the space between the two spring block elements is only filled partially by an elastic material so that, up to a certain load greater than the minimum load, this material can become distorted by resisting the approach of the two elements without offering a large supplementary resistance to the vertical deflection in compression of the spring.

This elastic material can, for example, occupy a space corresponding to that between the spring elements when the spring unit is compressed by the maximum available load.

In this case, when the spring is subjected to a load higher than the fuel load, the elastic material thus fills the whole of the space between the spring blocks and it operates to give the spring unit additional resistance to deflection in compression.

Figure 2:
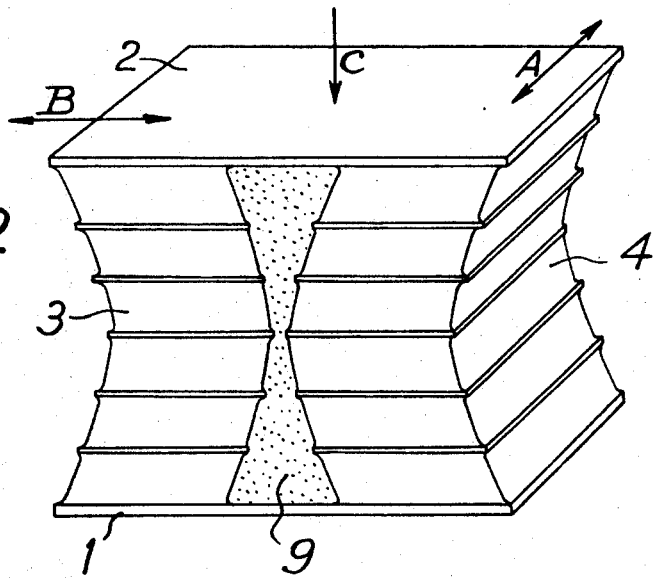
Figure 3:
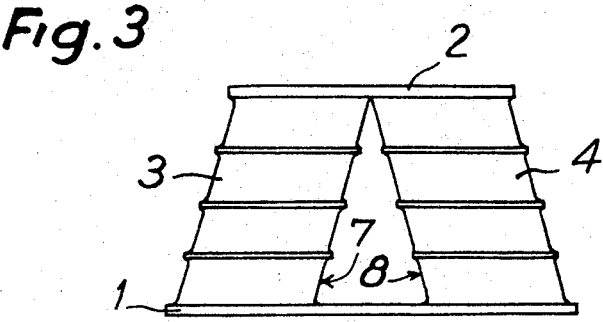
Figure 14:
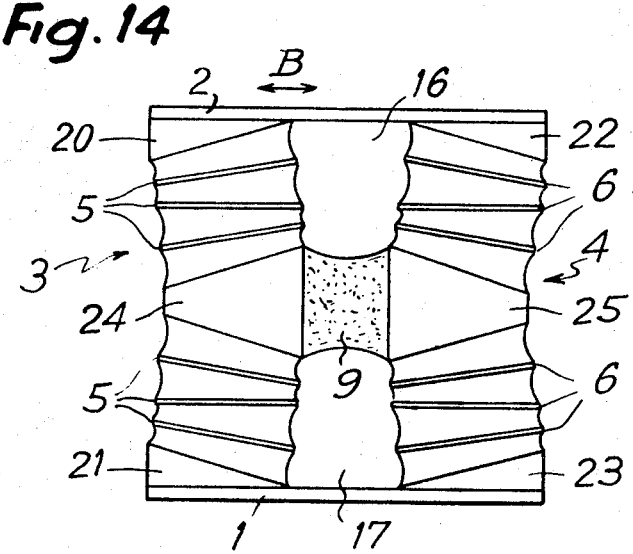
Figure 15:
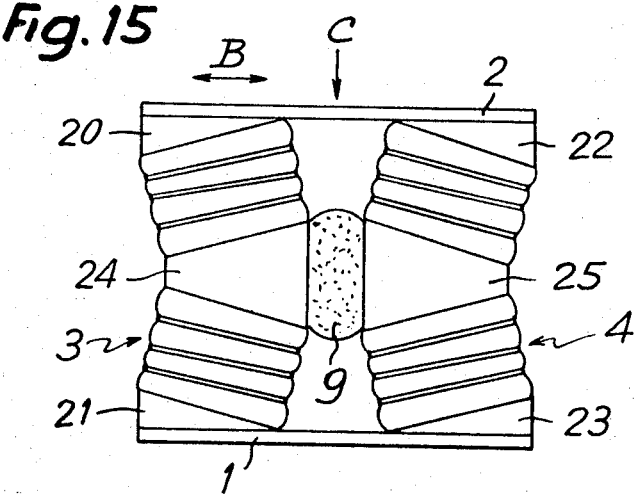

In order that the invention may be more clearly understood, reference will now be made to the accompanying drawings, which show some embodiments thereof by way of example, and in which:

FIG. 1 shows a view in perspective of a first embodiment of rubber spring unit according to the invention, FIG. 2 shows a schematic view in elevation of a second embodiment, FIG. 3 shows a view in elevation of another embodiment, FIGS. 4, 5 and 6 show in elevation, section and plan, respectively, another embodiment of a rubber spring unit according to the invention, FIGS. 7, 8 and 9 show schematic views in elevation, part-section and part-plan of a bogie of a railway carriage to illustrate the use of a spring according to the invention, FIG. 10 shows a view in elevation of a modification of the invention, FIG. 11 and FIG. 12 show views in elevation and in section respectively, of another embodiment, FIG. 13 shows in elevation the spring of FIG. 11 in a flexed position, and FIGS. 14 and 15 show views in elevation of another embodiment of the spring at rest and in a flexed condition, respectively.

Referring now to the drawings, in the case of FIG. 1 the rubber spring forms an assembly comprising a rectangular member with lower and upper metal end plates 1 and 2, respectively, situated in parallel horizontal planes and fixed or resting respectively on the support member and the part to be supported. The spring thus works under compression to support vertically the load C. It can, moreover, work occasionally with the rubber in shear when it is subjected to forces directed horizontally along the lines A or B. If the spring is used for lateral support of the body in a carriage suspension it can be assumed that the direction A is the longitudinal direction of the carriage and the direction B the transverse direction thereof according to which it is desired more especially to obtain a rigidity in shear increasing with the load C.

In accordance with the invention, two spring block elements 3 and 4 are fixed in a position spaced between the end plates 1 and 2. These elements comprise intermediate plates 5 and 6 and offer lateral faces 7 and 8 which are inclined one toward the other in a convergent-divergent manner as shown. In the central part of the spring, the lateral inclined faces 7 and 8 can be gently moved apart from one another when the spring is not loaded. When the spring is compressed, these inclined faces 7 and 8 come into contact with each other, as the load C increases. The two elements 3 and 4 abut one another as is shown by the dash-dot lines on FIG. 1, which tends to increase the rigidity in horizontal shear of the spring unit in the transverse direction B.

This tightening effect in horizontal shear can again be increased by placing, in the space between the inclined lateral faces 7 and 8 of the two elements, an elastic material 9 such as, for example, a cellular rubber (FIG. 2). This material 9 resists the approach of the two spring elements 3 and 4 and increases in a more progressive way the rigidity in horizontal shear of the unit at the same time that the load under compression increases. By choosing, as desired, the various technical characteristics of the spring (dimensions, number of intermediate plates, properties of the rubber and of the cellular material etc.) it can be arranged so that the rigidity in horizontal transverse shear increases with the load under compression in such a manner that the proper transverse frequency remains substantially constant whatever the variation of the load within certain limits satisfactory for the use envisaged.

FIG. 3 shows schematically another spring according to the invention. In this case, the spring comprises two spring elements 3 and 4, whose lateral faces 7 and 8 converge upwardly instead of exhibiting the convergent-divergent form of FIG. 1.

The spring shown in FIGS. 4 to 6 is intended to be used, for example, as a lateral support of the body 10 of a railway carriage such as a goods wagon or a passenger carriage, that is to say, a carriage in which the load C exerted vertically by the body 10 on the lateral supports can vary to a great extent between the unladen weight and the full load. As shown before, it is important in such uses that the resistance of the lateral supports to longitudinal and transverse forces does not diminish as the load increases as occurs with ordinary rubber springs. Put in another way, the rigidity in horizontal shear of the supports must remain constant or preferably increase, at least in the transverse direction, when the load under compression exerted by the body on the supports increases.

As can be seen in FIGS. 7, 8 and 9, the lateral supports R are placed one on each side of the body to support the latter on the bogie chassis 12. These springs ensure a certain vertical flexibility of the suspension of the body as well as the vertical flexibility which can also be ensured, above all, by the springs 13 of the first suspension placed between the axle-boxes 14 and the chassis of the bogie 12. These lateral supports R must, moreover, offer a good flexibility in the longitudinal direction to allow, for example, the rotation of the bogie with respect to the body when the carriage is moving along a curve as well as a definite flexibility in the transverse direction of the body. These movements of rotation and transverse displacements are permitted by the elasticity of the pivot 15 or of another equivalent system ensuring the transmission of the longitudinal traction and braking effects between the body 10 and the bogie 12. Finally, the lateral supports R ensure the filtering of the mechanical and sound vibrations during running.

The spring unit R shown in more detail in FIGS. 4 to 6 forms an assembly comprising a rectangular member with lower and upper metal end plates 1 and 2 situated in parallel horizontal planes, secured or resting respectively on the support member such as the bogie 12 or on the part to be supported such as the body 10. The spring unit thus works under compression in order to support the load C of the body 10 vertically. It can, moreover, work occasionally with the rubber in shear, when it is subjected to a horizontal force directed longitudinally along the line A, or transversely along the line B.

This spring unit is composed of two support block elements 3 and 4 having a rectangular section and these are secured in position by adhering them between the end plates 1 and 2, these elements comprising intermediate plates 5 and 6, alternating with the layers of rubber. These spring elements are displaced and located symmetrically on both sides of the intermediary vertical plan. They offer a curved shape and the lateral faces 7 and 8 opposite to one another are of convergent-divergent shape from one edge to the other of the elements, with a minimum spread to the right of the horizontal median plane.

The space between the lateral faces 7 and 8 of the elements is partially taken up by an elastically deformable material 9 leaving free spaces 16 and 17 adjacent the end plates 1 and 2.

When the spring is compressed by the load 3 exerted vertically, it flexes while distorting symmetrically towards the interior of the elements 3 and 4 as shown by the dash-dot lines on FIG. 4. The lateral convergent-divergent faces 7 and 8 approach one another and compress laterally between them the elastic filling material 9. The latter thus assumes the role of an elastic stop resisting the approach of the elements 3 and 4. These two elements thus lean on one another through the intermediary of the compressed elastic material 9 and this tends to increase the rigidity in shear of the spring unit and the resistance which it opposes to a transverse displacement of the load along the transverse direction B. However, with the embodiment shown, the rigidity in shear in the longitudinal direction A is not increased substantially, or at least it is increased in a lesser proportion, and this can be useful to preserve a suitable facility of pivoting of the body with respect to the bogie, whatever the loading conditions of the carriage.

The free spaces 16 and 17 left by the elastic filling 9 adjacent to the end plates 1 and 2, allow this filling to work only in lateral compressions under the effect of the blocks 3 and 4 and not to oppose the great resistance to vertical flexibility under compression of the spring unit, at least up to a certain value of the load C which is higher than the minimum load available. In effect, free spaces 16 and 17 can be arranged in that the filling 9 corresponds to the space remaining between elements which have come together when the spring supports the maximum load provided. From this maximum load, the material 9 thus fills all the space between the spring block elements and it intervenes to give the spring unit an additional resistance to the flexibility in compression.

As indicated above, the filling 9 can be a compressible elastic material such as cellular rubber. It can also be of a substantially incompressible elastic material such as ordinary rubber offering the desired resilience. It will, moreover, be understood that by suitably choosing the various technical characteristics of the spring units (dimensions, number of intermediate plates, flexibility of the rubber of the blocks and of the filling, and so on) the spring unit may be given any desired characteristics of rigidity in vertical compression and in transverse shear, this latter being increased with the load in compression within certain limits satisfactory for the uses envisaged. It will also be understood that from the embodiment described above, other methods of operation can be envisaged, for example, by subdividing the spring into different parts in order to assemble them afterwards so as to facilitate production and the assembly. It should also be observed that in FIGS. 4 and 7 the two elements 3 and 4 have been shown as being each secured to end half-plates which are linked at the time of assembly to form the end plates 1 and 2. Likewise, the spaces 16 and 17 provided so as not to tighten the spring unit under compression up to a definite load can be in the form of holes or recesses suitably arranged in the filling 9.

FIG. 10 shows another embodiment of the invention in which the elements 3 and 4 which are inclined towards each other in a convergent-divergent manner, each comprise a rigid intermediate support member 18 and 19 whose lateral opposing faces 20 and 21 are planar. These support members 18 and 19 are, when at rest or unloaded, moved away from one another and separated by an elastic spring member 9. When the load increases and the spring unit bends, the elements 3 and 4 tend to draw near to their intermediate support members by laterally compressing the filling 9 which, as previously, increases the stiffness in shear in the transverse direction B. The elastic filling 9 could be omitted, the support members 18 and 19 thus coming into direct contact with one another. Alternatively the filling 9 would fill a volume bigger than that between the members 18 and 19, that is to say, it would extend more towards the plates 1 and 2.

The spring unit shown in FIGS. 11 to 13 can again be used as a side bearer of the body in a railway carriage suspension.

It is made up of two spring block elements of rectangular section 3 and 4, which are parallel when unloaded and spaced symmetrically on both sides of an intermediary vertical plane x–x and fixed on their ends at the corners 20, 21 and 22, 23 integral with the end plates 1 and 2. Each pair of corners 20, 21 and 22, 23 offers concurrent surfaces inclined in a V-shape towards the exterior of the spring. Between their extremities and possibly in their median part, the elements 3 and 4 comprise intermediate elements in the form of corners 24, 25 with surfaces inclined parallel to the end surfaces of the corners which are opposite them. Between the inclined surfaces of the corners, the block elements are made up of layers of rubber and alternating intermediate plates 5 and 6 adhered to the rubber, these plates being parallel to the inclined surfaces corresponding to the corners.

With this construction, when the spring is compressed by a load C exerted vertically, it gives way, distorting symmetrically the elements 3 and 4 which incline towards the interior (FIG. 13) due to the horizontal components to which the inclination of the end corners and the intermediate corners to which are the rubber blocks are fixed, accommodate. The spring block elements thus take the convergent-divergent form in approaching one another. This approaching movement can continue until the lateral surfaces opposite the intermediate corners 24 and 25 come into contact so that the blocks 3, 4 shoulder and abut each other, which has the effect of increasing the transverse rigidity of the spring unit. However, it is preferable to place, between the lateral surfaces opposite the corner 24, 25, a filling element 9 of elastically distorted material. This material, compressed laterally between the corners 23, 25 when the spring flexes, assumes the role of a progressive elastic stop resisting the approach of the spring block elements 3 and 4. This tends to increase progressively the transverse rigidity of the flexed spring, that is to say, the resistance that it opposes, to a relative horizontal displacement of the load 3 along the transverse direction B. However, with the same embodiment, the rigidity in shear in the longitudinal direction A is not increased substantially, or at least it is increased in a lesser proportion and this can be useful to preserve a suitable facility of pivoting of the body with respect to the bogie whatever the load conditions of the vehicle may be.

The elastic element 9 can be cellular rubber or of ordinary rubber of the desired flexibility. It can be adhered to the corners 24, 25 and occupy only the space between the lateral faces of the corners 24, 25 or a larger space. It is preferably, however, that it leaves free spaces 16, 17 adjacent to the end plates 1 and 2 so as to be able to distort liberally at least up to the application of the maximum load on the spring.

As in the previous embodiments, the diverse technical characteristics of the spring (dimensions, inclination of the corners, and of the filling 9 and others) can be selected to give the spring the desired characteristics of rigidity in compression and of rigidity in longitudinal and transverse shear.

FIGS. 14 and 15 show another embodiment of the invention in which the spring block elements 3 and 4 are at rest, are inclined one towards the other in a convergent-divergent manner. Moreover, instead of having parallel intermediate plates, the elements 3 and 4 comprise intermediate plates 5 and 6 which are themselves inclined with respect to the corresponding surfaces of the end corners 20, 21 and 22, 23 and the intermediate corners 24, 25, the directions of the plates situated near to the end corners extending outwardly whilst the directions of the plates situated near the intermediary corners extend inwardly.

At rest or in a lightly compressed state, the spring ensures a transverse horizontal displacement of the load along the line B by making at least a part of the rubber deform in pure shear. When the spring is compressed more strongly, the intermediate plates 5 and 6 tend to become parallel to the inclined surfaces of the corners (FIG. 15). In the case of lateral displacement of the load along the line B, the rubber of the elements works in combined shear-compression between the inclined surfaces of the corners and of the plates. This arrangement of the intermediate plates offers a more accentuated effect of transverse stiffening when the spring flexes in compression.

We claim:

1. In a rubber compression spring unit of the type comprising elements having layers of rubber bonded to metal end and intermediate plates, whereby said spring unit may work principally in compression to support a load exerting vertical forces and occasionally in shear under horizontal forces the improvement which consists in that said spring unit comprises at least two spring block elements spaced horizontally and positioned so that, when the spring unit is deflected in compression, said elements tend to approach each other and to lean on one another, which increases progressively the horizontal stiffness in shear as the compressive loading increases.

2. A spring according to claim 1, wherein said two spring elements are inclined towards one another so as to approach and lean on one another when said spring unit flexes under compression.

3. A spring according to claim 1, wherein said spring elements are inclined in a convergent-divergent manner from one end of said spring unit to the other.

4. A spring unit according to claim 1, wherein the space between said two elements is filled by an elastic material which resists the approach of said elements and ensures a more progressive increase of the rigidity in horizontal shear.

5. A spring unit according to claim 4, wherein said space between said two elements is only partially filled by an elastically deformable material so that up to a certain load, higher than the minimum load, this material may distort whilst resisting the approach of said two elements without offering an appreciable additional resistance to the vertical flexibility in compression of the spring unit.

6. A spring unit according to claim 5, wherein said elastic material occupies a space corresponding to that left between said elements when said spring unit is flexed in compression with the maximum available load.

7. A spring unit according to claim 4, which comprises two spring elements whose opposing lateral faces are convergent-divergent from one end to the other of said spring unit and said elastic material occupies the median part of said space, between the said lateral faces by leaving spaces adjacent to said end plates.

8. A spring unit according to claim 7, wherein said two elements are placed on both sides of an intermediate vertical plan and are spaced laterally by a distance greater than the distance moved during approach of said elements when said spring unit is flexed in compression, said space being occupied by said elastic material.

9. A spring unit according to claim 1, wherein an intermediate support member is located between said spring elements, said intermediate support members being urged together when said spring unit flexes in compression.

10. A spring unit according to claim 1, wherein said elements are fixed to said end plates following inclined surfaces so that when the spring unit flexes under a compression load, said elements tend to approach one another.

11. A spring unit according to claim 10, wherein the ends of said elements are fixed to corners secured to said end plates.

12. A spring unit according to claim 11, wherein said elements comprise between their ends, intermediate support members in the shape of a corner with surfaces inclined parallel to the inclined surfaces of said end corners which oppose them.

13. A spring unit according to claim 12, wherein, at rest, said two elements are inclined in a convergent-divergent manner from one end of the spring to the other.

14. A spring unit according to claim 11, wherein said intermediate plates of said elements are parallel to the inclined faces corresponding to the end corners and the intermediate corners.

15. A spring unit according to claim 13, wherein said intermediate plates of said elements are themselves inclined with respect to the faces of the end and intermediate corners.